United States Patent Office 3,366,603
Patented Jan. 30, 1968

3,366,603
EPOXY RESINOUS COMPOSITIONS
Irvin S. Klaus and William S. Knowles, St. Louis, Mo., assignors to Monsanto Company, St. Louis, Mo., a corporation of Delaware
No Drawing. Filed June 30, 1966, Ser. No. 561,743
7 Claims. (Cl. 260—47)

This invention relates to new and useful compositions. More particularly the invention relates to epoxy resin compositions which possess desirable physical properties, particularly low shrinkage characteristics.

The change in volume that a thermoset resin undergoes during the curing reaction is a fundamental and important characteristic of the resin system. The dimensional changes are important per se in such operations as tooling with plastics. In encapsulating and laminating, the dimensional changes are not as important in themselves as are the stresses set up in the cured resin as a result of shrinkage. The shrinkage factor is particularly important in potting and encapsulating, since excessive shrinkage could result in separation of electrical component from the protecting resin, leaving voids to be penetrated by moisture. Shrinkage generally occurs in polymerizations as a logical consequence of forming large molecules from small ones. In vinyl polymerization the shrinkage amounts to as much as 34%. A lower degree of shrinkage, about 5–6%, is found in the curing of unfilled epoxy resins and in no case does shrinkage appear to be absent.

There are presently three general ways to combat the contraction problem. The first is to use an inert filler to dilute the effect. A number of fillers have been employed, among them iron and aluminum oxides, graphite, powdered aluminum and the like. Shrinkage is reduced by introduction of fillers but no granular filler for epoxies is known which has the specific reinforcing action that carbon black has on rubber. Although filler helps lowering the heat of reaction, peak temperature and coefficient of thermal expansion, tensile strength, elongation and compressive strength is reduced. Furthermore the use of fillers results in the increase of viscosity of the liquid wax making pouring more difficult and heightening the danger of weak spots from entrapped air.

A second method used in reducing the contraction problem is to use materials that are liquid at high molecular weights so there will be less change in molecular size going from liquid to solid. The use of thiokol-epoxy blends affords an example of this type. It should be noted that electrical properties of such compositions are not as good.

A third method comprises the addition of a gas forming agent like isocyanate and a little water to form a slightly foamed polymer. The foaming agents when introduced into the mixture decompose to liberate a gas resulting in foaming. The locations of the bubbles within the polymer represent points of weakness and it is this lack of strength in addition to difficulty in the proper control of the foaming which limits the application of this method.

Carboxylic acid curing agents such as phthalic anhydride and maleic anhydride have been used, and do not reduce the shrinkage sufficiently to overcome the aforedescribed disadvantages but provide an adverse effect of lower heat distortion temperatures, elongation and impact strength of the cured epoxy resin products.

It is accordingly a primary object of this invention to provide a novel anhydride cured epoxy resin characterized by superior low shrinkage.

Another object of this invention is to provide an anhydride cured epoxy resin composition in which the anhydride is the sole essential curing agent.

These and still other objects, features and advantages will become apparent from the following detailed description.

Broadly stated, the product of the invention comprises a cured resinous composition including an epoxy resin cured with a curing agent selected from the group consisting of hexahydrohomophthalic anhydride and dodecahydrodiphenic anhydride, in an amount ranging from about 40 to about 60 percent by weight of the compositions. Unexpectedly, it has been discovered a resinous composition cured at about 80° C. with one of the aforedescribed anhydrides will result in a product having superior low shrinkage characteristics.

A small amount of a tertiary amine, preferably pyridine, may be added to the composition in amounts of from about 0.1 to 3.0 parts by weight per hundred parts by weight of the epoxy resin for the purpose of accelerating the cure. Other tertiary amines, such as benzyl dimethyl amine, triethylamine, tripropylamine, tributylamine, 4-methylpyridine, imidazole and 4 - methyl imidazole may be used.

Glycidyl polyethers, ethoxyline, epoxy or epoxide resins, as they are variously called, are well known to those skilled in the art. The epoxide resins useful in the compositions and methods of this invention are those organic compounds containing at least one 1,2 - epoxy group, i.e.

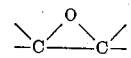

These compounds may be saturated or unsaturated, aliphatic, cycloaliphatic, aromatic or heterocyclic and may contain substituents such as halogen atoms, OH groups, ether radicals and the like.

Generally, such epoxide resins comprise a polyether derivative of a polyhydric organic compound, said derivative containing 1,2-epoxy groups and said compound being selected from the group consisting of polyhydric alcohols and phenols containing at least two phenolic hydroxy groups.

Among the polyhydric phenols which may be used in preparing such glycidyl polyethers are the mononuclear phenols such as resorcinol, catechol, hydroquinone, etc. and the polynuclear phenols, such as bis(4-hydroxyphenyl)-2,2-propane, 4,4'-dihydroxybenzophenone, bis(4-hydroxyphenyl)-1,1-ethane, bis(4-hydroxyphenyl) - 1,1-isobutane, bis(4-hydroxyphenyl)-2,2-butane, bis(4-hydroxy-2-methylphenyl)-2,2-propane, bis(4 - hydroxy-2-tertiary butylphenyl)-2,2-propane, bis(4 - hydroxy-2,5-dichlorophenyl)-2,2-propane, 4,4'-dihydroxybiphenyl, 4,4'-dihydroxypentachlorobisphenyl, bis(2 - hydroxynaphthyl)-methane, 1,5-dihydroxy naphthalene, phloroglucinol, 1,4-dihydroxynaphthalene, 1,4-bis(4-hydroxyphenyl) cyclohexane, etc. as well as other complex polyhydric phenols such as pyrogallol, phloroglucinol and novalac resins from the condensation of a phenol with an aldehyde in the presence of an acidic condensation catalyst. For the nature and preparation of novalac resins, see the book by T. S. Carswell, "Phenoplasts," 1947, p. 29, et. seq.

The preferred polynuclear phenol is bis(4-hydroxyphenyl)-2,2-propane, known in the trade as Bisphenol-A.

In admixture with the named polynuclear phenols, use also may be made of those polynuclear phenols wherein the phenol nuclei are joined by sulfur bridges, as for example, in 4,4'-dihydroxydiphenyl sulfone.

Less preferably, there can be used 1,2-epoxy containing polyethers of aliphatic polyhydric alcohols, such as the polyglycidyl ethers thereof, as for example, the diglycidyl ethers of ethylene glycol, propylene glycol, trimethylene glycol, triethylene glycol, butylene glycol, diethylene glycol, 4,4'-dihydroxydicyclohexyl, glycerol, dipropylene glycol and the like, as well as ethers containing more than two glycidyl groups such as the glycidyl polyethers, glycerol, mannitol, sorbitol, polyallyl alcohol, polyvinyl alcohol and the like. Such glycidyl polyethers also have a 1,2-epoxy value greater than 1.0.

These epoxide resins, or glycidyl polyethers as they are frequently called, may be prepared by reacting predetermined amounts of at least one polyhydric compound and one epihalohydrin in an alkaline medium.

While it is preferred to use epichlorohydrin as the epihalohydrin in the preparation of the epoxide starting materials of the present invention, other epihalohydrins such as epibromohydrin may be used advantageously.

In the preparation of the epoxide resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide, may be employed; although for economic reasons, sodium hydroxide is obviously preferred.

The product of the above described reaction instead of being a single simple compound is generally a complex mixture of glycidyl polyethers, but the principal product may be represented by the formula

wherein $n$ is an integer of the series 0, 1, 2, 3 . . . , and R represents a divalent hydrocarbon radical of a polyhydric compound and preferably, a dihydric phenol. While for any single molecule $n$ is an integer, the fact that the obtained polyether is a mixture of compounds causes the determined value for $n$, e.g. from molecular weight measurement, to be an average which is not necessarily a whole number.

The epoxides suitable for use in this invention have a 1,2-epoxy equivalency greater than 1.0. By epoxy equivalency, reference is made to the average number of 1,2-epoxy groups

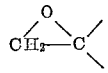

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form so that the epoxy equivalency of these compounds may be quite low and contain fractional values, and therefore the epoxy equivalency of the product is not necessarily an integer such as 2, 3, 4 and the like. The epoxide resin may, for example, have an equivalency of 1.5, 1.8, 2.5 and the like. The epoxide equivalent of the epoxide resins which may be employed is 140–3000 and preferably in the range of 170–2000.

Epoxides are disclosed in various places in the art; among the references which may be mentioned are U.S. Patents: 2,324,483, 2,444,333, 2,494,295, 2,500,600, 2,503,726, 2,511,913, 2,518,056, 2,558,949, 2,579,698, 2,582,985, 2,592,560, 2,615,007, 2,615,008, and 2,633,458.

Commercially available epoxy resins (epichlorohydrin bisphenol resins which may be termed glycidyl polyethers of a dihydric phenol) suitable for use in the present invention are the "Epon" resins sold by the Shell Chemical Corporation, New York, N.Y., "Araldite" resins manufactured by the Ciba Company, New York, N.Y., "Epi-Rez" resins sold by the Jones-Dabney Company, Louisville, Ky. and ERL resins sold by the Bakelite Company, Division of Union Carbide and Carbon Corporation. Data on several types are given in Table I below:

TABLE I

| Trade Name and Number | Epoxide Equivalent Wt. | Viscosity,* 25° C. (Gardner-Holt) | M.P., ° C. Durran Mercury Method |
|---|---|---|---|
| Epi-Rez 510 | 180–200 | 90–180 poises | Liquid |
| Epon 815 | 175–210 | 5–9 poises | Liquid |
| Epon 828 | 175–210 | 50–150 poises | 8–12 |
| ERL 2774 | 185–200 | 105–195 | 8–12 |
| Epon 834 | 225–290 | O–V | 20–28 |
| Epon 1001 | 450–525 | C–G | 64–76 |
| Epon 1004 | 870–1,025 | Q–U | 95–105 |
| Epon 1007 | 1,650–2,050 | Y–Z | 125–132 |

*The viscosities of Epon 815, Epon 828, and ERL 2774 are on pure resin, Epon 834 on 70% weight solution in butyl carbitol, and all other types on 40% weight solution in butyl carbitol.

The epoxide equivalent weights as set forth in Table I represent the grams of resin containing one gram equivalent of epoxide. The epoxy equivalency, as the term is used herein, is defined as the nmber of 1,2-epoxy groups per molecule and is obtained by dividing the epoxide equivalent weight by the molecular weight.

The preferred polyethers are prepared from bis(4-hydroxyphenyl)propane and contain a chain of alternating glyceryl and 2,2-bis(4-phenylene) propane radicals separated by intervening ethereal oxygen atoms and have a 1,2-epoxy equivalency between 1 and 2, an epoxide equivalent weight of about 175 to 600, preferably from about 175 to 370. A particularly suitable material for use in the invention is the normally liquid glycidyl polyether of Bisphenol-A having an epoxide equivalent weight of about 175 to 220 and a 1,2-epoxy equivalency of about 1.8 to 1.95.

Another group of epoxide resins that may be used are those which are derived by the reaction of peracetic acid and unsaturated compounds. A typical member of this class is the epoxide resin derived from butadiene and crotonaldehyde which have undergone the Diels-Alder condensation and the Tischenko reaction:

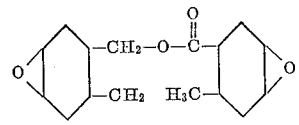

This compound is sold commercially as Epoxide 201 by Union Carbide Chemical Company.

Still another group of epoxide resins are the polyepoxide polyesters which are prepared by epoxidizing the unsaturated portions of the tetrahydrophthalic residues in the polyester composition. These polyepoxide polyester compositions, as well as their preparation, are described in U.S. Patent 2,847,394.

Various other ingredients may be mixed with the resinous compositions of the present invention, including pigments, colors, fillers, resin stabilizers, flexibilizing modifiers and the like.

In order to indicate more specifically the advantages of the use of the curing agents of the present invention in epoxy resins, the following examples are set forth. Control examples utilizing conventional curing agents are included for comparison. The epoxy resins are admixed in the proportions indicated in Table II with the specific curing agent and catalyst. The proportions of epoxy resin and curing agent is generally in the ratio of about 1 mol of epoxide per mol of curing agent. Parts given are as parts by weight unless otherwise indicated.

TABLE II

| Component | Composition | | | |
|---|---|---|---|---|
| | A | B | C | D |
| Epi-Rez 510 | 100 | 100 | 100 | 100 |
| Phthalic Anhydride (Control) | 70 | | | |
| Succinic Anhydride (Control) | | 48 | | |
| Hexahydrohomophthalic Anhydride | | | 80 | |
| Dodecahydrodiphenic Anhydride | | | | 112 |
| Pyridine | 1 | 1 | 1 | 1 |

The compositions shown in Table II are cured for 20 hours using 1% pyridine at the temperature indicated in Table III.

The shrinkage and hardness characteristics of the compositions of Table II are shown in Table III.

The percent shrinkage is determined by density measurements. The densities of the liquids is determined by pycnometer and for the solids by determining the displaced mercury in a wide mouth pycnometer. All densities are run at the curing temperature.

The hardness values are determined on a Barcol Impressor model GYZJ–934–1.

TABLE III

| Composition | Curing Temp., °C. | Density Reactants | Density Product | Percent Shrinkage | Hardness |
|---|---|---|---|---|---|
| A | 105 | 1.1526 | 1.2229 | 5.8 | 24 |
| B | 105 | 1.1361 | 1.2010 | 5.4 | 12 |
| C | 80 | 1.1367 | 1.1700 | 2.8 | 35 |
| D | 80 | 1.1056 | 1.1334 | 2.5 | 27 |

From the foregoing results it is evident that the curing agents of this invention impart outstanding shrinkage and hardness characteristics to epoxy resins over compositions prepared with conventional curing agents.

The epoxy resin compositions of this invention are useful as casting resins, mica bonds, surface coatings, moldings, adhesives, sealants, resin products generally, and insulation of all kinds for electrical equipment.

While this invention has been described with respect to certain embodiments, it is not so limited, and it is to be understood that variations and modifications thereof may be made which are obvious to those skilled in the art without departing from the spirit or scope of this invention.

The embodiments of the invention in which an exclusive property or privilege is claimed are defined as follows:

1. A composition of matter comprising an epoxy resin having a 1,2-epoxy equivalency of greater than 1 and an epoxy curing agent selected from the group consisting of hexahydrohomophthalic anhydride and dodecahydrodiphenic anhydride, said curing agent being present in an amount to provide from about 0.75 to about 1.25 anhydride equivalents per epoxide equivalent of said epoxy resin.

2. A composition of claim 1 wherein said curing agent is present in an amount to provide from about 0.85 to about 1.0 anhydride equivalents per epoxide equivalent of said epoxy resin.

3. A composition of claim 1 wherein the epoxy resin is a polyether of bis(4-hydroxyphenyl)-2,2-propane and an epihalohydrin.

4. A composition of claim 1 wherein the epoxy resin has an epoxide equivalent weight of from about 140 to about 3000.

5. A composition of claim 4 wherein the epoxy resin has an epoxide equivalent weight of from about 175 to about 220.

6. A composition of claim 1 wherein the curing agent is hexahydrohomophthalic anhydride.

7. A composition of claim 1 wherein the curing agent is dodecahydrodiphenic anhydride.

No references cited.

WILLIAM H. SHORT, *Primary Examiner.*

T. D. KERWIN, *Assistant Examiner.*